United States Patent [19]

Crossland

[11] 4,279,152
[45] Jul. 21, 1981

[54] TEMPERATURE RESPONSIVE DEVICE

[75] Inventor: William A. Crossland, Harlow, England

[73] Assignee: International Standard Electric Corporation, New York, N.Y.

[21] Appl. No.: 13,868

[22] Filed: Feb. 22, 1979

[30] Foreign Application Priority Data

Mar. 2, 1978 [GB] United Kingdom ............... 8393/78

[51] Int. Cl.³ .................. C09K 3/34; G02F 1/13; G01K 11/06; G01K 11/16
[52] U.S. Cl. ........................ 73/356; 73/358; 116/216; 116/217; 116/219; 252/299.1; 252/408; 350/340; 350/349; 350/350 R; 350/350 S; 350/351
[58] Field of Search ............ 350/331 T, 340, 346, 350/349, 350 R, 350 S, 351; 252/299, 408; 73/356, 358; 116/216, 217, 219

[56] References Cited

U.S. PATENT DOCUMENTS

| | | | |
|---|---|---|---|
| 3,796,999 | 3/1974 | Kahn | 252/299 |
| 3,960,750 | 6/1976 | Moriyama et al. | 252/299 |
| 3,960,753 | 6/1976 | Larrabee | 350/350 F |
| 4,032,219 | 6/1977 | Constant et al. | 350/349 |
| 4,040,047 | 8/1977 | Hareng et al. | 252/299 |
| 4,077,260 | 3/1978 | Gray et al. | 252/299 |
| 4,098,301 | 7/1978 | Bloom et al. | 350/349 |
| 4,139,273 | 2/1979 | Crossland et al. | 252/299 |
| 4,145,114 | 3/1979 | Coates et al. | 252/299 |
| 4,196,974 | 4/1980 | Hareng et al. | 252/299 |

FOREIGN PATENT DOCUMENTS

| | | | |
|---|---|---|---|
| 2104 | 5/1979 | European Pat. Off. | 252/299 |
| 1506256 | 4/1978 | United Kingdom | 252/299 |

OTHER PUBLICATIONS

Constant, J., et al., "Photostable Antraquinone Pleochroic Dyes", presented at 7th Intern'l L. C. Conf., Bordeaux, Fr. (Jul. 1978).
Tani, C., et al., Appl. Phys. Lett., vol. 33, No. 4, pp. 275-277 (Aug. 1978).
Hareng, M., et al., Appl. Phys. Lett., vol. 25, No. 12, pp. 683-686 (Dec. 1974).
Taylor, G. N., et al.; J. Appl. Phys., vol. 45, No. 10, pp. 4330-4338 (1974).

*Primary Examiner*—Teddy S. Gron
*Attorney, Agent, or Firm*—John T. O'Halloran; Thomas N. Twomey

[57] ABSTRACT

A liquid crystal temperature indicator that gives a visual indication of whether the device is at a temperature above or below one or more threshold values has a homeotropically aligned nematic or smectic layer incorporating a pleochroic dye. The color of the cell changes as the dye will only absorb normally incident light when the temperature causes the liquid to go isotropic. Electrodes may be provided to provide electronic detection of the passage of the liquid through the threshold temperature.

8 Claims, 3 Drawing Figures ure. The isotropic dye provides a small measure of absorption even in the homeotropic state of the nematic, and so the change of appearance upon transition is from neutral grey to blue.

TEMPERATURE RESPONSIVE DEVICE

BACKGROUND OF THE INVENTION

This invention relates to temperature responsive devices that give a visual indication as to whether their temperature is above or below a predetermined threshold value.

SUMMARY OF THE INVENTION

According to the present invention there is provided a temperature responsive device that provides a visual indication as to whether its temperature is above or below a predetermined threshold value, which device includes a thin liquid layer the major constituent of which is a liquid that exhibits a nematic-isotropic or smectic-isotropic phase transition, in which layer a quantity of pleochroic dye has been dispersed, which layer is bounded by the walls of a sealed cell formed by two plates, at least one of which is transparent, and a perimeter seal, and wherein the interior walls of the cell are such that, in the absence of an applied electric field the liquid assumes homeotropic alignment when its temperature is below that of said phase transition. The invention also resides in a temperature indicator incorporating an integral array of such devices.

A particular feature of this type of temperature responsive device or indicator is that, unlike the known cholesteric liquid crystal temperature indicators that work by Bragg reflection, the choice of a particular liquid crystal material to provide a particular threshold temperature does not finally determine the color change associated with the transition through that threshold. The same liquid crystal material can be used with different dyes to provide different display effects.

The anisotropy of a homeotropic aligned liquid crystal layer is such that if one of these devices is provided with suitable electrodes the transition to and from the isotropic state may be detected electrically, either by the capacitance change resulting from the transition, or by the charge displacement resulting from that transition. The detection of the capacitance change is described in United Kindgom Application No. 34777/75 to which attention is directed.

BRIEF DESCRIPTION OF THE DRAWINGS

There follows a description of temperature responsive devices embodying the invention in preferred forms. The description refers to the accompanying drawings in which.

DETAILED DESCRIPTION OF THE INVENTION

Figure 1:
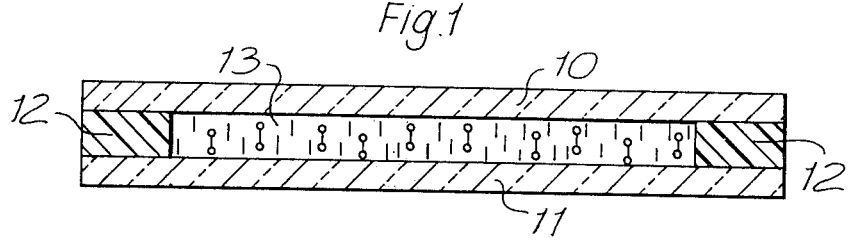
FIGS. 1 and 2 depict a schematic cross section through a temperature responsive device respectively at temperatures below and above the liquid crystal isotropic phase transition temperature.
Figure 2:
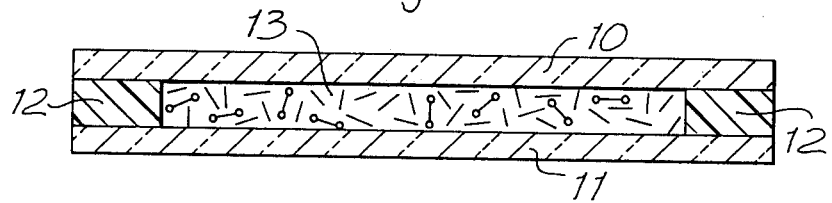

Referring to FIGS. 1 and 2 a sealed cell is constructed from two glass plates 10 and 11 secured together with a perimeter seal 12 so as to form an envelope for a liquid layer 13. The thickness of the layer lies in the range from 2 μm to 100 μm, and is generally 15 μm. The cell is filled via an aperture (not shown) formed by a break in the perimeter seal 12. This aperture is then sealed off after the cell has been filled. When the perimeter seal is one made by fusion of a glass frit, the aperture may be filled with a plug of indium, or alternatively it may be filled by a soldering technique, the walls of the aperture having been metallized prior to the filling. When the perimeter seal is made of a resin the aperture may also be sealed off with resin.

The major constituent of the liquid layer 13 is a liquid that exhibit a reversible nematic-isotropic or smectic-isotropic phase transition. A preferred range of materials in the former class are the cyano-biphenyls. For instance the eutectic mixtures sold by B.D.H. Chemicals Ltd. under the designation E7 and E1 have nematic-isotropic phase transition temperatures of 60° C. and 28° C. respectively. It is of course not necessary to use eutectic mixtures, and by varying the mixture the transition temperature can by adjusted to any particular value within a set range. An example of a liquid providing a smecticisotropic phase transition is 4-cyano-4$^1$-biphenyl decanoate which undergoes the smectic-isotropic phase transition at 74° C. This material may be mixed with higher homologues, in the manner that the cyano-biphenyl nematics are mixed, in order to provide different materials with different transition temperatures. In general, nematic materials have been more widely used, and hence are more readily available than smectics, but the use of smectic materials may be preferred for the present application because they tend to exhibit higher order parameters, and therefore slightly more highly contrasting color changes.

It is required that when the layer is below the phase transition temperature the molecules of the liquid shall, in the absence of any disturbing electric field, assume homeotropic alignment as depicted in FIG. 1. Homeotropic alignment may be induced in a number of different ways. For instance it may be induced by dipping the glass sheets 10 and 11 into a 1% solution of hexadecyl trimethyl ammonium bromide in methanol prior to their assembly. Alternatively a lecithin solution may be used. If the cell is glass frit sealed, good homeotropic alignment should result, without special surface treatment, due to the cleanliness of the surfaces. However, homeotropic alignment may be further promoted by the addition to the liquid of a small quantity (0.1%) of a polyamide curing agent such as that sold under the designation Versamid.

Throughout the layer is dispersed a small quantity of a pleochroic dye. A preferred dye for a blue coloration is the dichroic dye N-1-(4-hydroxyanth raquinone)-4$^1$-butoxyaniline. When used with the cyanobiphenyl nematics referred to previously, it is preferred to add also a small quantity of a yellow isotropic dye such as waxoline yellow to neutralize the residual blue in the appearance of the homeotropically aligned nematic resulting from the departure of the order parameter from unity. The addition of this isotropic dye provides a neutral grey that is of such small density in a 15 μm layer as to be scarcely, if at all, noticeable.

FIG. 1 shows the device at a temperature below the nematic isotropic phase transition, in which the dye molecules are held in homeotropic alignment by the cyano-biphenyl molecules. Under these conditions the device appears virtually transparent to substantially normally incident light. If the temperature is raised so that the layer becomes isotropic, as depicted in FIG. 2, the dye molecules assume random orientations. Under these conditions there is selective absorption of the light, with the result that the cell assumes a blue appearance. For providing displays of other colors there exist a large number of pleochroic dyes including azo dyes, cyanine dyes, as well as other anthraquinone dyes.

It will be noted that the transition from below the nematic-isotropic (or smectic-isotropic) phase transition to above it produces a clear to colored change in the appearance of the device. This can be modified to produce a change in appearance from one color to another either by the incorporation of a suitable isotropic dye into the cell or by use of a colored background against which the device is viewed.

Figure 3:
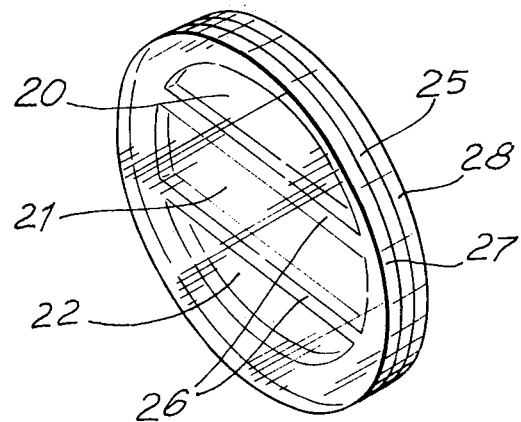
FIG. 3 depicts a temperature indicator consisting of an integral structure of three temperature responsive devices.

This use of a colored background or isotropic dye is exemplified in the temperature indicator now to be described with reference to FIG. 3. This indicator has two thresholds so as to indicate when it is within a predetermined acceptable temperature range, and to show, when it is outside this range, whether the temperature is too high or too low. Since there are the two predetermined thresholds, there need to be at least two separate cells each filled with its own particular composition exhibiting the required nematic or smectic properties. By way of example the indicator of FIG. 3 has an integral array of three cells 20, 21 and 22 formed by perimeter seals in the form of a ring 25 with two bars 26 securing together a pair of glass discs 27 and 28. Cells 20 and 22 have identical fillings incorporating a material whose nematic-isotropic (or smectic isotropic) phase change occurs at the lower temperature limit of the 'acceptable' range while that of cell 21 is at the upper limit. Cells 20 and 22 have a yellow pleochroic dye and a blue isotropic dye while cell 21 is provided with a red pleochroic dye. When the indicator is at a temperature beneath the 'acceptable' range all the fillings are homeotropically aligned, and therefore the indicator shows up as a blue disk (cells 20 and 22) with a transparent bar (cell 21). As the temperature is raised into the 'acceptable' range the transparent bar remains unchanged, but the rest of the disk turns green when the filling of cells 20 and 22 go isotropic, and the pleochroic yellow dye starts to absorb substantially normally incident light. As the temperature is raised still further the green disk becomes crossed with a red bar when the temperature exceeds the acceptable range and the filling of cell 21 goes iostropic. The indicator may be provided with sample color patches for the purposes of comparison with the colors of the three cells.

These temperature responsive devices do not need to have any internal electrode structure in order to provide their visual effect, but such electrodes may be provided in order to let the devices perform an electronic control function. For this purpose the electrodes are connected to a sensing circuit which is adapted either to sense the capacitance change occurring when the filling passes through the isotropic-liquid crystalline phase transition, or to sense the voltage pulse generated on going through this transition. In the former case the circuitry is adapted to sense a change in steady state as the capacitance of the device changes with the change in the value of the dielectric constant of the filling, whereas in the latter case the circuitry is adapted to sense a transient effect produced by the change in capacitance. In the latter case the device needs potential difference to exist across its electrodes. The amount of charge required to produce this potential difference is a function of capacitance, and hence a change of capacitance produces a change in potential, after which a flow of charge is required in order to restore the potential to original value.

While I have described above the principles of my invention in connection with specific apparatus it is to be clearly understood that this description is made only by way of example and not as a limitation to the scope of my invention as set forth in the objects thereof and in the accompanying claims.

What is claimed is:

1. A temperature indicator that provides a visual indication as to whether its temperature is above or below each of at least two predetermined threshold values, comprising at least two temperature responsive cells each of said cells comprises a liquid layer the major constituent of which is a liquid that exhibits a nematic-isotropic or smectic-isotropic phase transition, in which layer a pleochroic dye has been dispersed, which layer is bounded by cell walls formed by two plates at least one of which is transparent and wherein the interior of said walls are such that homeotropic alignment is induced in said liquid without the application of an electric field when its temperature is below that of said phase transition and wherein the liquid in one cell has a different phase transition temperature from that of the liquid in another cell.

2. The temperature indicator of claim 1 having two temperature thresholds wherein the indicator displays a blue color when its temperature is beneath both threshold values, a green color when its temperature is beneath only one of the threshold values, and a red color when its temperature is above both threshold values.

3. The temperature indicator of claim 1 or 2 wherein the indicator includes a set of sample color patches for the purposes of comparison with the colors exhibited by the liquids contained in the cells.

4. A temperature indicator as claimed in claim 1 wherein an electrical circuit is connected to a set of electrodes fixed to the plates of each of said cells, said circuit adapted to detect the capacitance change associated with the transition of each cell through its temperature threshold value.

5. The temperature indicator of claim 4 wherein said circuit is adapted to detect changes in the steady state value of the capacitance associated with each device.

6. The temperature indicator of claim 4 wherein said circuit is adapted to detect transient voltage or current pulses associated with the transition of each device through its temperature threshold value.

7. A temperature indicator as claimed in claim 1 wherein the color of the pleochroic dye dispersed into one cell is different from that of the dye in another cell, thereby providing a different color display for each temperature range relative to each of said threshold values.

8. A temperature indicator that provides a visual indication of its temperature by identifying one of a plurality of temperature ranges comprising:
   a plurality of temperature responsive cells each of which exhibits a distinct phase transition temperature;
   said cells comprising a liquid crystal layer which exhibits a reversible phase transition without the application of any electrical field, and which assumes homeotropic alignment when below said phase transition temperature absent any electric field;
   a plurality of pleochroic dyes respectively dispersed into said cells to impart a distinct color to each cell when above its distinct transition temperature;
   means for retaining said plurality of cells in close proximity to provide an integral array of cells,
   whereby, visual inspection of said array will provide an indication of which cells are above their phase transition temperatures and which are not.

* * * * *